United States Patent [19]
Mozer

[11] Patent Number: 4,637,442
[45] Date of Patent: Jan. 20, 1987

[54] MACHINE FOR CORING STUMPS

[76] Inventor: Daniel S. Mozer, 126 Grandview Ave., Yardville Heights, N.J. 08620

[21] Appl. No.: 767,398

[22] Filed: Aug. 20, 1985

[51] Int. Cl.$^4$ .......................... A01G 23/06; B27L 7/00
[52] U.S. Cl. .................................... 144/2 N; 144/3 R; 144/35 R; 144/193 R; 144/193 A; 144/365; 144/366; 144/367
[58] Field of Search .............. 144/2 N, 193 R, 193 A, 144/35 R, 3 R, 366, 365, 367

[56] References Cited
FOREIGN PATENT DOCUMENTS

| 632769 | 2/1962 | Italy | 144/2 N |
| 895360 | 1/1982 | U.S.S.R. | 144/2 N |

Primary Examiner—W. D. Bray
Attorney, Agent, or Firm—Sperry, Zoda & Kane

[57] ABSTRACT

A machine for coring stumps includes an area for receiving a tree stump that has been removed from the ground. Positioned above this area is an X-shaped wedge concentric with a cylindrical saw, having an annular saw blade. The wedge is dropped into engagement with the stump to aid in holding it steady. The saw is then rotated at cutting speed while being driven downwardly through the stump to remove a core therefrom, leaving only salvageable dirt and loose roots, and debris capable of being easily disposed of. The cylindrical saw is then retracted and the wedge is now driven downwardly through the core to split the core into four logs of quadrantal cross section, providing logs of so-called "fireplace length".

23 Claims, 10 Drawing Figures

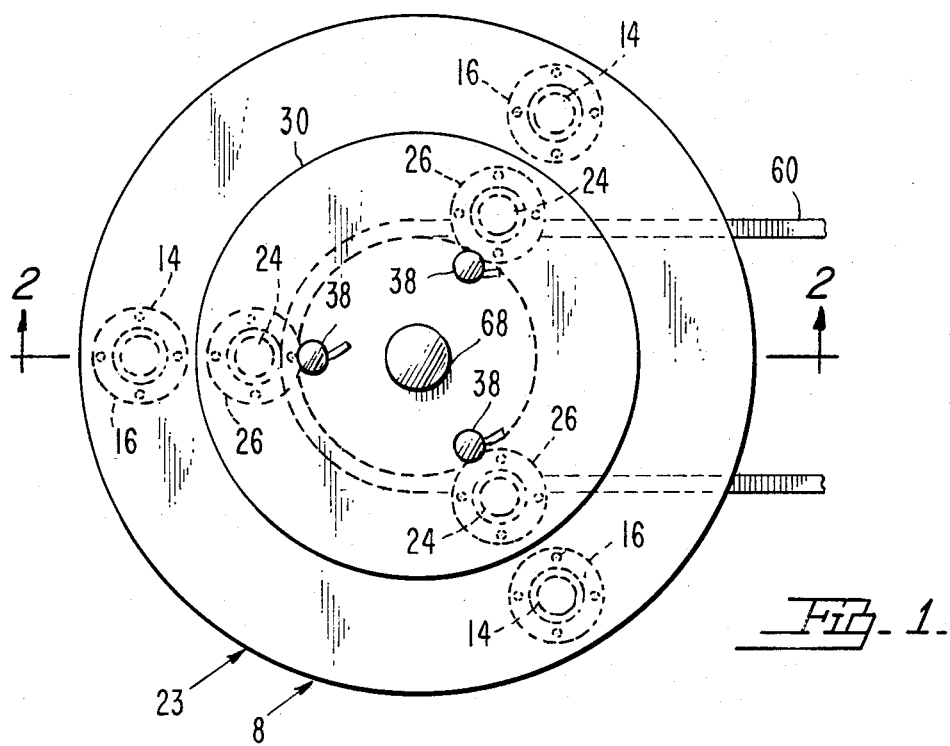
FIG. 1.
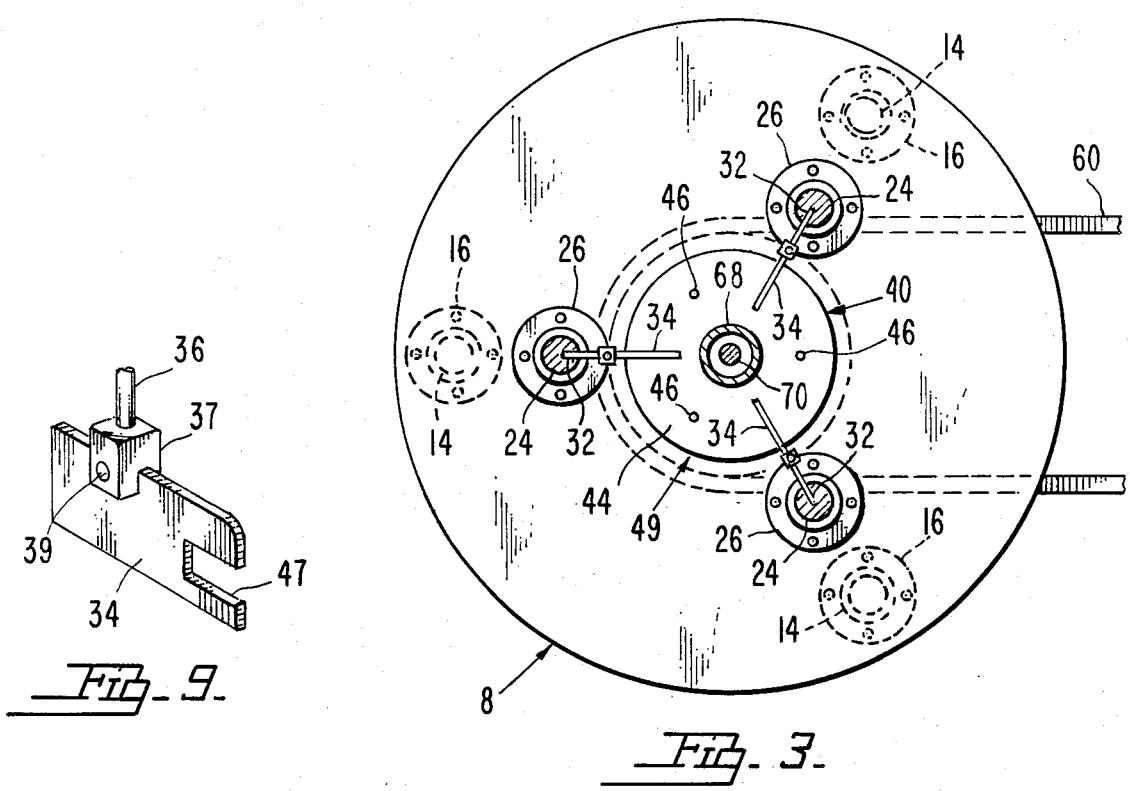
FIG. 9.
FIG. 3.

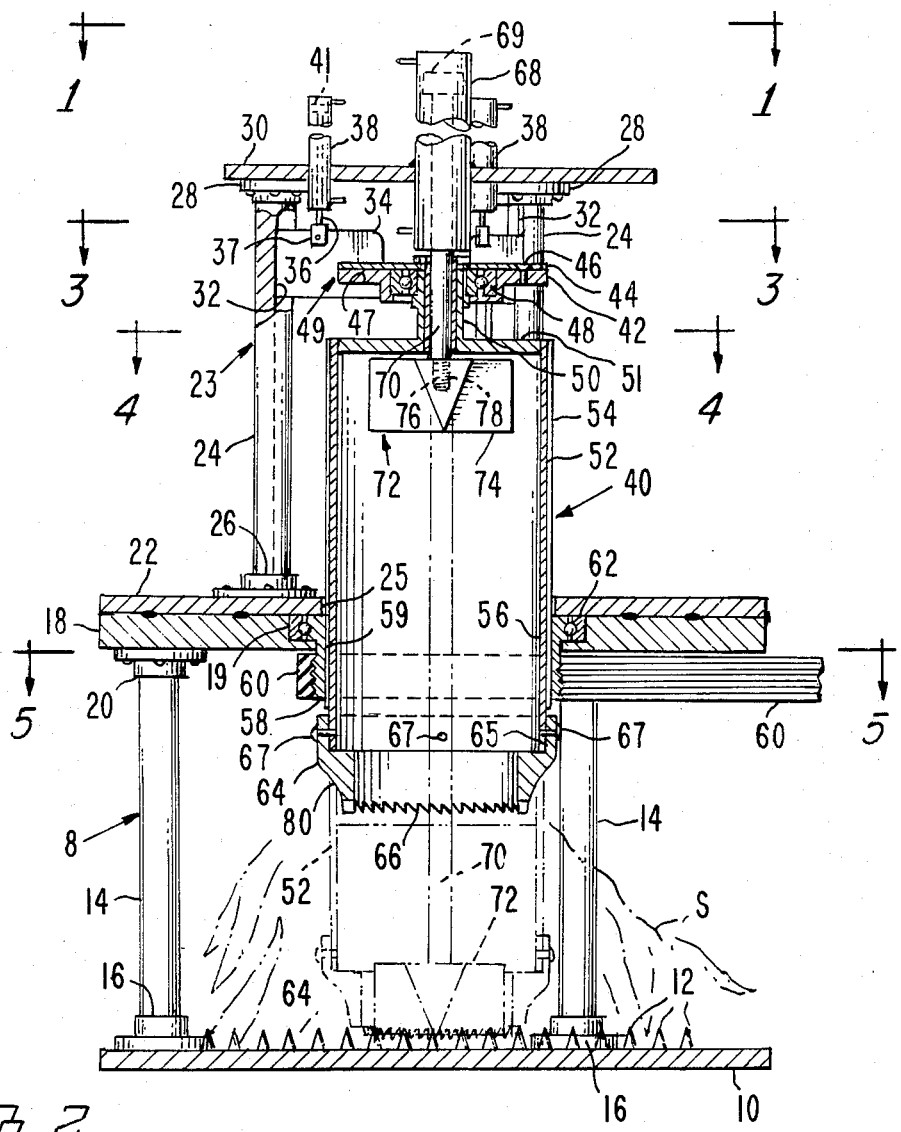

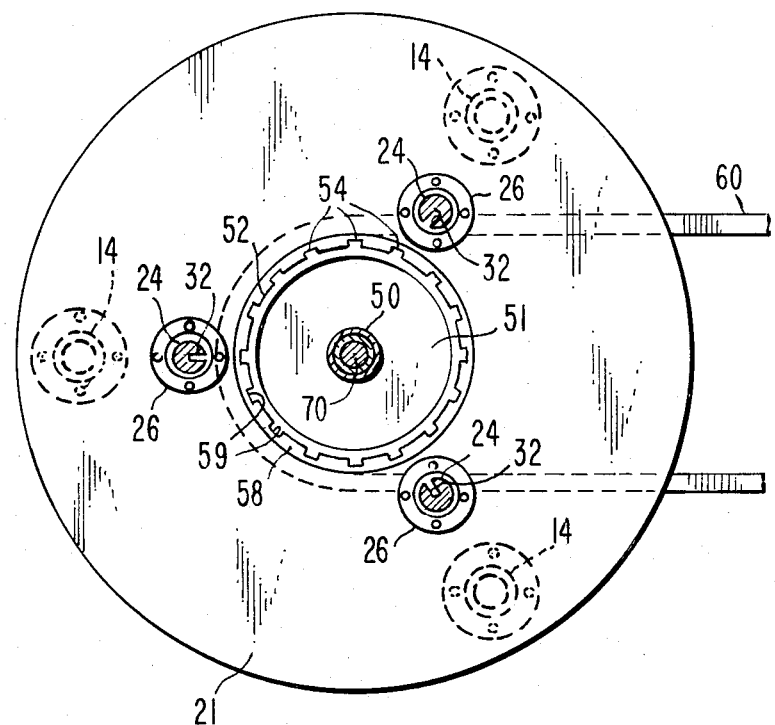
_Fig_4_
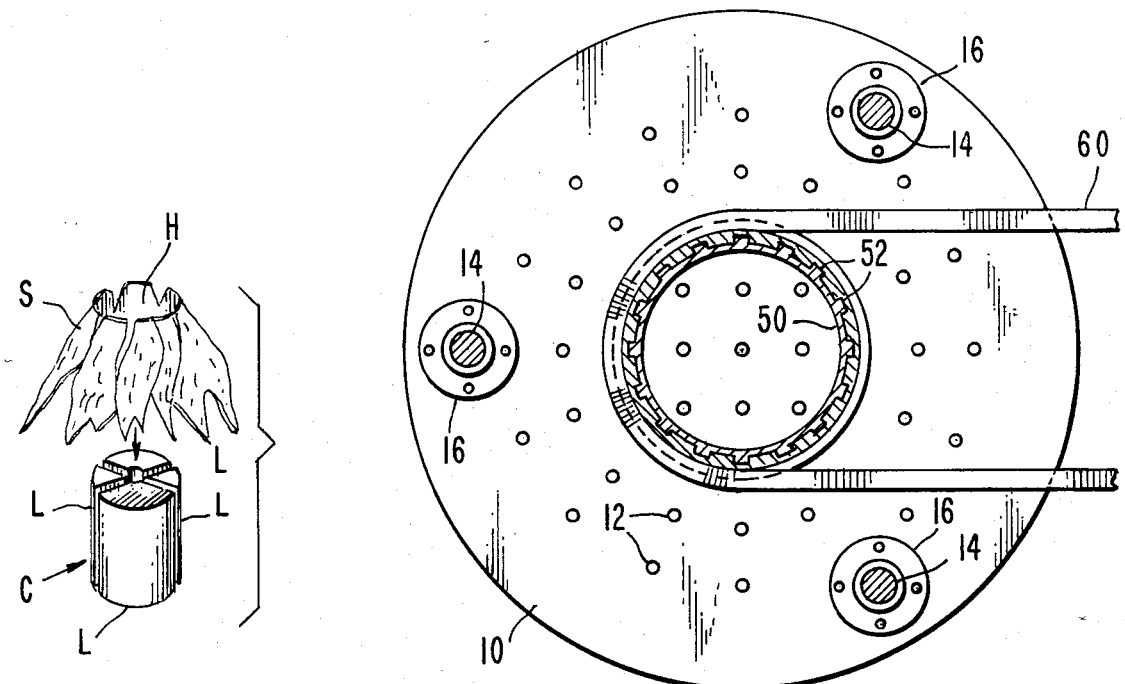
_Fig_10_  _Fig_5_

MACHINE FOR CORING STUMPS

BACKGROUND OF THE INVENTION

1. Field Of The Invention

The present invention relates generally to the field of machines for disposing of tree stumps. In a more particular sense, the invention has reference to a machine for apparatus of this type that is so designed as to swiftly and easily, with a minimum of labor, core a stump to remove and split its center for use thereof as firewood, leaving only a hollow, relatively loose mass of dirt and small roots both of which can be readily salvaged, along with attached debris, capable of being readily disposed of.

The invention thus relates, in a specific sense, to the field of coring tree stumps that have been pulled out of the ground.

2. Description Of The Prior Art

Heretofore, it has been proposed to split stumps, bore holes in the centers thereof, quarter logs, or chew into stumps with toothed wheels for the purpose of breaking them up. However, it has never been proposed, so far as is known, to provide a machine which will remove the entire center of the stump as a complete core, and then split it into a plurality of pieces of usable firewood, while at the same time, leaving the surrounding portion of the stump as a loose mass of roots that can be easily ground for use as a mulching material or the like. Also remaining after removal of the core is a quantity of earth which can be reclaimed.

The present invention has as its overall, broad purpose the provision of a machine of this type.

SUMMARY OF THE INVENTION

As summarized briefly, the present invention comprises a self-contained machine that includes a support structure, the lower portion of which provides a large area in which a stump may be positioned while a wedge is lowered to aid in stabilizing the stump. An elongated, vertically disposed, cylindrical saw is thereafter driven downwardly completely therethrough to cut a complete log of circular diameter from the stump. The machine is then operated after the saw is retracted, to drive a quartering wedge downwardly through the core. The quartering wedge splits the core into four fireplace logs of quadrantal cross section.

In accordance with the invention, the cylindrical saw is mounted in the support structure for vertical movement, while being rotated for the purpose of sawing through the stump. To this end, the cylindrical saw has exterior, longitudinal splines, mating with spline grooves of a drive pulley, whereby the cylindrical saw can be rotated at high speed, while being fed downwardly through the stump. For the purpose of feeding the cylindrical saw downwardly through the stump, there is provided a series of hydraulic rams, mounted on the support structure in engagement with shoes that slide vertically upon the support structure. The shoes are engaged with the cylindrical saw assembly in such a fashion as to impart a continued, steady, downward pressure upon the entire cylindrical saw assembly, while still permitting the assembly to be rotatably driven at high speed by the pulley means interengaged therewith.

Within the cylindrical saw assembly there is provided a quartering wedge, which is vertically slidable relative to the cylindrical saw assembly. The wedge is first advanced to contact the stump and hold it against movement while the core is being cut from the stump. When the core has been completely cut, the cylindrical saw assembly is retracted, after which a hydraulic ram drives the quartering wedge downwardly through the core, to split it into quarters.

BRIEF DESCRIPTION OF THE DRAWINGS

While the invention is particularly pointed out distinctly claimed in the concluding portions herein, a preferred embodiment is set forth in the following detailed description which may be best understood when read in connection with the accompanying drawings, in which:

FIG. 1 is a top plan view of a machine for coring stumps, formed in accordance with the present invention, as seen from line 1—1 of FIG. 2;

FIG. 2 is a vertical sectional view through the machine, taking substantially on line 2—2 of FIG. 1, a stump being shown in dotted lines in position to be cored, the cylindrical saw assembly and the quartering wedge being shown in full and chain-dotted lines in their retracted and advanced positions, respectively;

FIG. 3 is a horizontal sectional view substantially on line 3—3 of FIG. 2, illustrating the guide means for the cylindrical saw, whereby said saw may be driven downwardly while being maintained in a vertical position;

FIG. 4 is a horizontal section on line 4-4 of FIG. 2;

FIG. 5 is a horizontal section substantially on line 5—5 of FIG. 2, illustrating the drive means for the cylindrical saw;

FIG. 6 is a perspective view of the quartering wedge, per se;

FIG. 7 is a fragmentary vertical sectional view illustrating the cylindrical saw assembly assembled with a saw blade of a smaller diameter, and with a correspondingly smaller splitter;

FIG. 8 is a perspective view showing one of the saw blades, per se;

FIG. 9 is a perspective view illustrating one of the guide shoes and its connection to an associated hydraulic ram; and FIG. 10 is an exploded perspective view illustrating the stump with the core removed therefrom and split into quarters.

DETAILED DESCRIPTION OF THE PREFERRED EMBODIMENTS

Referring to the drawing in detail, the present invention includes a supporting structure or framework generally designated 8, which may have any of various forms, so long as it will support the working or moving parts of the mechanism in their proper relationship, and with the capability of performing their assigned functions. The support structure 8 illustrated in the drawing serves this end, through the provision of a flat, heavy, circular base 10 which, as shown to best advantage in FIGS. 2 and 5, is formed with a plurality of upwardly projecting, sharpened, conical teeth or cleats 12 which in the illustrated example are arranged in a plurality of diametrically extending, crossing rows, so as to strongly grip, and hold in a stable, upright position, a tree stump S. As will be noted from FIG. 2 the tree stump is preferably cut, as would be the normal procedure, with a horizontal, flat top surface, to facilitate entry of the annular saw supported upon the structure 8.

Extending upwardly from the base 10 adjacent the periphery thereof are vertical, tubular supporting posts 14. In the illustrated example (see FIG. 1) three of these are provided, to facilitate entry of large stumps and positioning of said stumps upon the base in a centered location relative to the several posts 14. The posts are uniformly, angularly spaced about the circumference of the base 10, and are mounted through the provision of base flanges 16 which are fixedly secured to the base 10, and which receive the lower ends of the supporting posts.

A circular, horizontally disposed support plate 18, of a diameter which may desirably be approximately equal to that of the base 10, is supported in an elevated position above the base by the several posts 14. To this end, downwardly opening mounting flanges 20 are fixedly secured to the underside of the plate 18, to receive the upper ends of the several posts 14. Plate 18 is formed with a shouldered central opening 19, to receive the cylindrical saw assembly incorporated in the stump coring apparatus comprising the present invention.

Welded or otherwise fixedly secured to the support plate 18, and overlying the support plate, is a bearing retainer plate 22, having a central opening 25 concentric with, and overhanging the edge of, the opening 19.

A superstructure generally designated 23 is incorporated in the machine as part of the support structure 8, and extends upwardly from the bearing retainer plate 22. The superstructure includes a plurality of vertical guide posts 24 which, as shown in FIGS. 1 and 4, are three in number in the presently preferred embodiment, and are uniformly, angularly spaced about the concentric openings 19, 25. Guide posts 24, at their lower ends, are engaged in mounting flanges 26 bolted or otherwise fixedly secured to the bearing retainer plate 22 in close proximity to the opening 25 thereof. At their upper ends, the guide posts 24 are received in downwardly opening mounting flanges 28 that are fixedly secured to the underside of a hydraulic cylinder support plate 30 included as part of the superstructure 23.

As will be noted from FIGS. 2 and 4, the several guide posts 24 are formed with elongated guide slots 32 all of which open inwardly and which, as seen from FIG. 2, extend substantially the entire length of their associated guide posts 24. The guide slots receive the outer ends of plate-like shoes 34 which extend radially inwardly from the several guide posts 24. Secured to the shoes are rams or piston shafts 36, having downwardly opening yokes 37 (see FIG. 9) secured by rivets or screws 39 to their associated shoes 34. The shafts 36 extend into hydraulic cylinders 38, and within the cylinders are secured to pistons 41. Shafts 36, pistons 41 and cylinders 38 constitute, in and of themselves, conventional hydraulic rams, which as understood are adapted to receive hydraulic fluid above the pistons for the purpose of imparting downward movement to the shafts 36. When the shafts are to be moved upwardly, pressure is exerted by hydraulic fluid admitted to the cylinder, below the piston 41, for the purpose of moving the shafts 36, and their associated shoes 34 in an upward direction to their normally retracted positions shown in FIG. 2 in full lines.

A circular saw assembly generally designated 40 includes, at its upper end, a horizontally disposed guide plate 42, to the upper surface of which a flat, circular bearing retainer plate 44, of the same diameter as guide plate 42, is fixedly secured to the guide plate through the provision of a plurality of bolts or rivets 46. There is thus defined a guide plate assembly generally designated 49, the outer circumference of which extends into inwardly opening support slots 47 formed in the inner ends of the several shoes 34. Accordingly, when the several shoes are driven downwardly or retracted, they carry the guide plate assembly 49 with them.

A ball bearing assembly 48 is carried by the guide plate 42 as part of the guide plate assembly, and is held in place by the bearing retainer plate 44. The inner race of the ball bearing assembly extends about a bushed, tubular neck 50, whereby said tubular neck is freely rotatable within the guide plate assembly 49. The guide plate assembly, thus, is not required to rotate, but supports the circular saw assembly 40 for rotational movement. The neck 50 is integral or otherwise rigid with the closed end wall 51 of an elongated, vertically disposed, hollow cylinder 52 of the circular saw assembly. Cylinder 52, over substantially its entire length, is formed with outwardly projecting, longitudinally extending splines 54, which as shown in FIG. 4 are uniformly, angularly spaced about the entire circumference of the cylinder 52 in the preferred embodiment of the invention.

An inner bearing race 56 extends about the cylinder 52 intermediate the opposite ends thereof, and in the present instance is integral with a drive pulley 58 having spline grooves 59 (see FIG. 4) receiving the several spline ribs 54 of the cylinder. A drive belt 60 extends about the drive pulley, and in a typical working embodiment, would be powered by an internal combustion engine, not shown, or some other suitable type of prime mover.

The lower bearing further includes an outer race 62. The ball bearing assembly defined by the inner and outer races, and by the series of balls disposed between them, is supported upon a shoulder formed on the wall of the opening 19 of support plate 18.

It is thus seen that upon driving of the belt 60, from the prime mover or other source of motive power, the drive pulley 58 will rotate the cylinder, while still leaving the cylinder free to slide upwardly and downwardly within the spline grooves 59.

The lower end of the cylinder is formed open, and secured thereto is an annular saw blade 64, having a shoulder 65 bearing against the lower extremity of the cylinder, and further having an upwardly projecting skirt secured to the cylinder through the provision of angularly spaced screws 67 or equivalent fasteners.

A centrally disposed hydraulic ram includes a hydraulic cylinder 68, within which a piston 69 is provided, to which there is secured a shaft 70, the lower end of which extends into cylinder 52. Within cylinder 52, the lower end of shaft 70 is secured to a quartering wedge generally designated 72, illustrated per se in FIG. 6. Wedge 72 is X-shaped, having a pair of wedge shaped blades 74 crossing at right angles and formed integrally with each other. In the top surface of the quartering wedge, there is formed an upwardly opening, threaded opening 76, in which is engaged the complementarily threaded lower end of the shaft 70. The wedge is of a size sufficient to permit it to move downwardly through the cylinder, past the saw blade, when the core of the stump is to be sawed free of the stump and quartered.

OPERATION

In use, a stump S is positioned in the area below the normally retracted cylinder 52. As shown in full lines in FIG. 2, the cylinder when retracted is drawn upwardly to a level above the top of the stump, to permit positioning of the stump upon the teeth 12. The quartering wedge 72 is fully retracted, and is at this time disposed in the upper portion of the cylinder.

The wedge 72 is now advanced into engagement with the top surface of the stump, just sufficiently to force the stump against the teeth 12. Continued pressure is maintained on the wedge to hold the stump firmly in position while the core is being sawed therefrom.

The cylinder is now rotated by means of the drive belt 60 and pulley 58. At the same time, pressure fluid is directed into the upper ends of the several hydraulic cylinders 38, above the pistons 41 thereof. As a result, the shafts 36 of the several pistons are forced downwardly, driving the shoes 34 downwardly within the guide slots 32, thus advancing the saw through the stump while rotating it at cutting speed.

At this point, it may be noted that in order to assure an even pressure upon the several guide shoes, the pressure fluid directed into the several cylinders 38 would come from a common source or reservoir, from which the fluid would be directed into all the cylinders simultaneously.

With the shoes 34 being forced downwardly within guide slots 32, the guide plate assembly 49 is shifted downwardly, while being held in a centered position by the several shoes. The cylinder 52, meanwhile, is being rotated, and turns freely in the upper and lower ball bearing assemblies carried by the guide plate assembly 49 and the plate 18 respectively.

As a result, a core C (FIG. 10) is cut from the center of the stump. Ultimately, the cylindrical saw means defined by the cylinder and the saw blade will move fully to the dotted line position shown in FIG. 2, at which time the saw blade will have cut through the entire stump to the bottom of the stump, fully severing the core from the loose roots, dirt and debris typically found at the margin of a stump that has been pulled from the ground.

The cylinder is now retracted to its normal, full line position shown in FIG. 2.

Meanwhile, the wedge remains in engagement with the top of the stump. When, now, the cylinder is fully retracted, the core is ready to be split into quarters.

To accomplish this, pressure fluid is directed into the upper end of cylinder 68, against piston 69, driving shaft 70 downwardly, The quartering wedge is thus forced downwardly through the stump to cause the wedge to split the confined core C into quarters, to provide fireplace logs L as shown in FIG. 10.

Thereafter, the quartering wedge and the cylinder are retracted to their full line positions of FIG. 2, permitting the ready removal of the quartered core.

At this time, the stump will be left with a hole H (FIG. 10), surrounded by a fragmented, relatively thin wall and loose roots, dirt, and the like. The wall surrounding the hole H, it may be noted, will have been broken up by reason of the fact that the saw blade 64 has a tapered exterior wall 80 that tends to act as a frusto-conical wedge adapted to expand and split the wall of the stump about the core, during the actual downward movement of the cylinder while the core is being cut.

In FIG. 7, there is shown a modified form which is similar in all respects to the construction already described, except for the fact that a smaller saw blade 64a is attached to the lower end of the cylinder 52. This shows that the diameter of the core to be cut can be varied as desired, by selection of a saw blade of the desired diameter, from any of a plurality of such blades. Normally, when a stand of trees is cut down, the trees tend to be of generally similar diameters, so a single saw blade suffices for coring the stumps of all the trees that have been removed. In other circumstances, it may be desirable that after stumps have been pulled from a site where trees have been removed, the stumps can be processed for coring in such a way that as a first group, stumps of the same general size would be cored; then in a second group stumps of a different size would be cored, etc.

Heretofore, the disposition of stumps after they have been pulled from the ground has been a continuing problem, in that stumps tend to be extremely unwieldy and heavy, and must be broken up in some fashion in order to permit them to be disposed of legally. By coring the stumps in situ, not only is a substantial quantity of fireplace wood salvaged, but also, the act of cutting out and quartering or halving the cores to obtain the firewood also demolishes the remainder of the stump by breaking it into relatively small, loose pieces that can be trucked away to a suitable disposal site with minimum difficulty and expense. It may be noted, in this regard, that the wedge of FIG. 6 would quarter the cores, while the modified wedge 72 as shown in FIG. 7 would be used simply for splitting each core in half longitudinally.

The obtaining of firewood is desirable, but perhaps the main benefit derives from the salvageability of the remainder of the stump. The loose roots can be fed into a grinder, producing a material prized by plant nurseries as a mulch or soil conditioner. Further, substantial quantities of loose earth, often rich in nutrients, are also salvageable from the stump and are highly saleable. Substantially the entire stump is thus capable of being salvaged.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. A machine for coring stumps, comprising:
   (a) a support structure;
   (b) an annular saw means mounted in said structure for rotation and for advancement along its axis of rotation, through a stump to be cored;
   (c) means for rotating said saw means; and
   (d) means for advancing the saw means, simultaneously with rotation thereof, to remove a core from said stump, the cylindrical saw means including an elongated hollow cylinder for confining the core while the core is being cut from the stump, said cylinder having a leading end and a trailing end in the sense of the direction in which the saw means is advanced through the stump, and an annular saw blade on the leading end of the cylinder, the support structure including a base adapted to provide a support for the stump to be cored, said saw means being mounted upon the support structure above the base for movement downwardly through the supported stump.

2. A machine for coring stumps as in claim 1 wherein the base includes a plurality of upwardly projecting teeth for positioning the supported stump upon the base.

3. A machine for coring stumps as in claim 1 wherein the support structure includes an annular support plate spaced upwardly from the base and a bearing means carried by the support plate, said cylinder and bearing means including mating splines and spline grooves, for mounting the cylinder upon the support plate for rotation and for axial advancement.

4. A machine for coring stumps as in claim 3 wherein the means for rotating the saw means includes a pulley having spline grooves mating with the splines of the cylinder, and a drive belt for the pulley.

5. A machine for coring stumps as in claim 3 including a superstructure mounted upon the support plate, and means carried by the superstructure for guiding the cylinder during its movement toward the base.

6. A machine for coring stumps as in claim 5 wherein the superstructure includes a plurality of guide posts angularly spaced about the cylinder, and guide shoes slidably engaged with the guide posts and supportably engaging the saw means for guiding the same in its movement along its rotational axis.

7. A machine for coring stumps as in claim 6 further including a plurality of hydraulic rams carried by the superstructure and connected to the shoes for driving the shoes downwardly along the guide posts to thereby advance the saw means through the stump.

8. A machine for coring stumps as in claim 7 wherein the saw means, at the trailing end thereof, includes an annular guide plate engaged with said shoes at angularly spaced locations about its circumference, said cylinder including, at its trailing end an extension rotatably mounted in said guide plate.

9. A machine for curing stumps, comprising:
(a) a support structure adapted for supporting a stump above the ground surface following its removal from the ground;
(b) an annular saw means mounted in said structure for rotation and for advancement along its axis of rotation, through a stump to be cored;
(c) means for rotating said saw means;
(d) means for advancing the saw means, simultaneously with rotation thereof, to remove a core from said stump;
(e) means for splitting said core; and
(f) means for advancing said coresplitting means relative to the saw means following the advancement of the saw means through the stump, the support structure including a base adapted to provide a support for the stump to be cored, said saw means and splitting means being mounted upon the support structure above the base for movement downwardly through the supported stump, said base being in the form of a plate underlying the stump to provide support therefor, and a series of projections extending upwardly from the plate into the supported stump for engaging the same against rotation in respect to the saw means.

10. A machine for coring stumps as in claim 9 wherein the saw means includes a cylinder mounted on the support structure for up-and-down movement and for rotation during said movement and having upper and lower ends, the support structure including an area below the cylinder for receiving the stump to be cored, said saw means further including an annular saw blade at the lower end of the cylinder adapted to cut a core from the stump responsive to rotation and downward movement of the cylinder, said splitting means being mounted within the cylinder for up-and-down movement relative to the cylinder for splitting the core after the core has been fully cut from the stump.

11. A machine for coring stumps as in claim 10 wherein the splitting means includes at least one wedge element within the cylinder normally disposed adjacent the upper end thereof, and means for advancing said element into engagement with the stump prior to advancement of the saw means, whereby to keep the stump stationary while the core is being cut, and for further advancing said element following retraction of the saw means so as to split the core into a plurality of segments usable as firewood.

12. A machine for coring stumps as in claim 11 wherein the splitting means further includes a shaft secured to the wedge element and slidably mounted in the upper end of the cylinder in concentric relation to the cylinder and saw blade, and means for imparting axial motion to the shaft relative to the cylinder to advance the wedge element relative to the cylinder.

13. A machine for coring stumps as in claim 12 wherein said means for imparting axial motion to the shaft is a hydraulic cylinder and a piston working therein and secured to the shaft.

14. A machine for coring stumps as in claim 9 wherein the splitting means includes a pair of crossing, perpendicularly intersecting wedge elements.

15. A machine for coring stumps comprising:
(a) a support structure adapted to extend above a stump to be cored;
(b) a cylindrically shaped saw means mounted on said structure for rotation and for axial movement downwardly through the stump for cutting a cylindrical core therefrom; and
(c) a splitting means mounted on said structure for movement axially of the saw means for splitting said core, and said support structure including a base formed as a flat plate adapted to provide a table-like surface for supporting a stump following removal of the same from the ground, a frame structure rigid with and extending upwardly from the base plate for supporting the saw means and splitting means, and a series of teeth rigid with the plate and extending upwardly therefrom at locations dispersed over the plate area for grippingly engaging the supported stump against rotatable movement in respect to the saw means in any of selected positions in which the stump is supported upon the base plate.

16. A machine for coring stumps as in claim 15 wherein the splitting means extends inside the saw means and is movable downwardly in respect thereto following the downward movement of the saw means through the stump and its retraction following the completion of the cutting of the core therefrom.

17. A machine for coring stumps as in claim 16 further including means extending between the support structure and the saw means for guiding the saw means during the downward movement thereof.

18. A machine for coring stumps as in claim 17 further including means engaged with the guide means for driving the same downwardly so as to impart said downward movement to the saw means.

19. A machine for coring stumps as in claim 18 further including means, independent of the means engaged with the guide means, for driving the splitting means downwardly relative to the saw means.

20. A machine for coring stumps as in claim 19 wherein the driving means for the guide means and the splitting means are in the form of hydraulic rams mounted upon said support structure.

21. A machine for coring stumps as in claim 20 wherein the support structure includes a plurality of guide posts angularly spaced about the saw means, said guide means including a plurality of guide shoes slidable along the posts and supportably engaging the saw means.

22. A machine for coring stumps as in claim 21 wherein the hydraulic rams for driving the guide means downwardly include a hydraulic cylinder and an associated shaft secured to each of the several shoes.

23. A machine for coring stumps as in claim 22 wherein the hydraulic ram for driving the splitting means downwardly is powered independently of the rams associated with said shoes.

* * * * *